Figure 1:
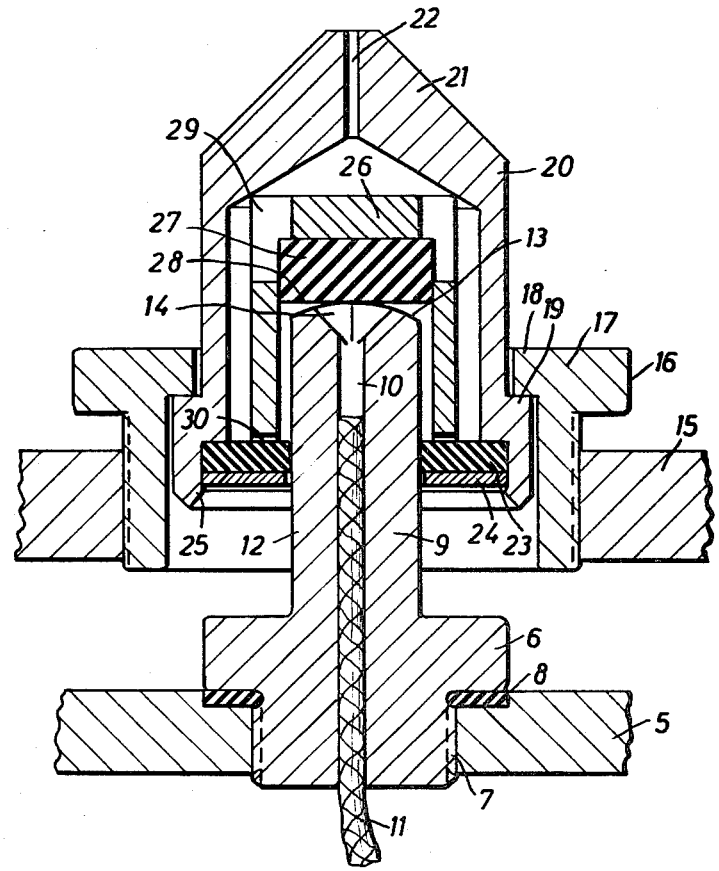
Figure 1:

Oct. 12, 1965    P. HELING    3,210,965
GAS REGULATING DEVICE
Filed March 10, 1964    2 Sheets-Sheet 1

INVENTOR
Paul Heling
BY
Michael J. Striker

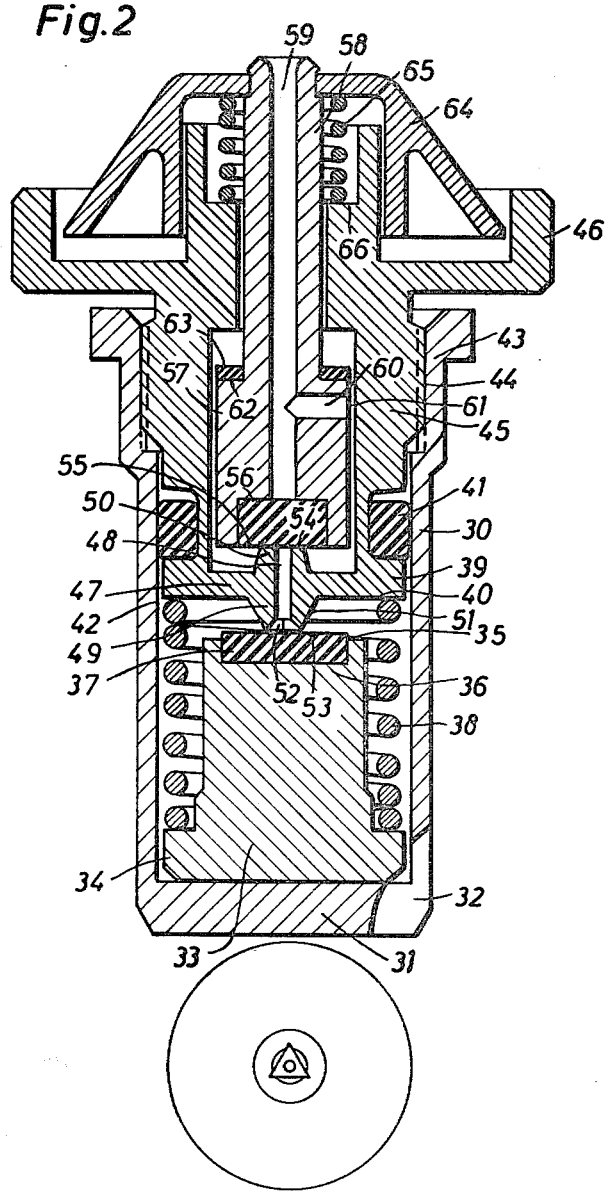

3,210,965
GAS REGULATING DEVICE
Paul Heling, Kleinenberger Strasse 51,
Solingen-Wald, Germany
Filed Mar. 10, 1964, Ser. No. 350,881
Claims priority, application Germany, Mar. 14, 1963,
W 34,091
9 Claims. (Cl. 67—7.1)

It is known to provide the burners of gas fueled lighters with regulating devices for regulating the out-flow of gas which is stored in the lighter reservoir in liquid form under pressure, which enable cigarettes, cigars or the like to be lit with a flame of smaller height and pipes and the like with a greater flame height. Similar regulating devices are also advantageous and capable of use on other pressure gas burners for example for lamps or the like.

Having regard to the high internal pressure in the reservoir, the strict requirements of complete tightness of the regulating devices and burner so that a comparatively small quantity of gas can be reliably and tightly retained over long periods and finally to the very small dimensions for example of a lady's pocket lighter and the difficulty of accurate mass production of the individual parts, the design of such regulating devices has presented difficulties. Throttling bodies of various kinds have been used but they do not make possible exact adjustment which remains over a period because they are subject to change due for example to wear. Attempts have been made to provide closure members using yielding sealing discs and bodies but the yielding bodies harden in time so that on one hand the sealing function is no longer fulfilled when they are closed and on the other hand on adjustment even with a very small movement too great a flow passage is opened. Spongy adjustment bodies having a cellular structure, suction bodies of textile nature and the like have also often been used in adjustment, these being compressed to a varying extent. Such devices are not satisfactory however because they become obstructed by impurities in the liquifying gas and thus become ineffective. These difficulties are overcome by the invention according to which a yielding, preferably flat sealing body, as for example a sealing disc of rubber, synthetic rubber or the like is paired with a closure body which in comparison with the sealing body is of harder material and presents a passage opening the edge of which is formed with irregularities e.g. with angular forms, the depth which the angular forms penetrate into the sealing body preferably being greater than the length of the forms.

It is unimportant how the two bodies are moved in relation to another, that is whether the sealing body is stationary and the closure body moves in relation to it, or vice versa. If the relative hardness of the two bodies is so chosen and the angular forms so shaped that the depth of penetration is less than the depth of the angular forms, the device can only be use as a regulating device in the sense of the invention, but not as a complete closure so that a closure body is additionally necessary. If however the conditions are chosen so that the depth of the angular forms is less than the depth of penetration this regulating device can also be used as a complete closure.

The angular forms can be produced in various ways thus for example by a larger or smaller number of axial slits in a tube, a star-shaped formation at the end of a tube and so forth.

A particularly simple regulating device which can be mass produced with simple equipment with satisfactory uniformity has the open edge of the closure body formed by two concentric mutually oppositely inclined different shaped boundary surfaces for example by an internal pyramidal surface which inter-penetrates an external part spherical surface. Thus for example a tubular closure body of any desired bore can be provided without difficulty and with great accuracy even when of small dimensions and in mass production, with a part spherical end surface by a pressing operation and by means of an angular punch, the bore can be shaped to an oppositely directed concentric pyramid, when by the inter-penetration of the two surfaces, three-dimensional very shallow angular forms are produced which afford high accuracy of regulation and are produced without forming any cuttings. Alternatively a closure body tube with for example a triangular or hexagonal bore, thus for example made from a triangular or hexagonal tube of a constant wall thickness can be provided with a part-spherical ground end surface and thus results in a similar form. Again a tube of circular cross section can be provided with a pyramidal end surface and so on.

Details of gas fueled lighter burners according to the invention and further details of the invention itself will appear from the following description of two examples illustrated in the accompanying drawings.

FIGURE 1 shows an much enlarged scale a burner for a gas fueled lighter in longitudinal section in which only a single movable body is provided as both the regulating and closure body while FIGURE 2 illustrates another example in which separate regulating and closure bodies are provided.

According to FIGURE 1, the top 5 of the reservoir of a gas fuel lighter is secured by means of a nipple 6, a screw thread 7 and a packing 8, a wick tube 9 integral with the nipple, in the bore 10 in which is set a wick 11. The wick tube 9 is cylindrical on its external surface 12, while according to the invention its end surface 13 is of part spherical form and the bore 10 has a pyramidally widening exit 14 formed in this example by a four sided pyramid with its apex downwardly directed.

In screw engagement with a part of the lighter for example a cover 15 fitted over the reservoir, is a screw member 17 having a knurled rim 16, and an inwardly projecting upper flange 18. This flange engages and retains the outwardly projecting flange 19 of a burner cap 20 which is surrounded by the member 17 and is closed at its upper end by a conical end 21. This has a burner passage 22 through it. At its lower open end the burner cap is provided with a packing 23 which is held by a metal disc 24 below which the burner cap is beaded over at 25. The packing 23 seals the burner cap to the cylindrical external surface 12 of the wick tube 9.

Within the burner cap is disposed an inverted cup 26 which on its bottom carries the regulating and closure disc 27 according to the invention, the flat surface 28 of which co-operates with the shaped edge of the mouth of the wick tube 9 to effect regulation and closure. The inverted cap is apertured by notches 29 at the top and notches 30 in its lower edge which provide free passage for the gas to the burner cap as soon as the regulating and sealing body 27 is lifted in relation to the mouth 14 of the wick tube.

In operation of this example of regulating device according to the invention, by rotation of the screw member 16 the burner cap 20 and therewith the regulating and sealing disc 27 is adjusted to a determined and desired flame height. If the burner cap 20 is depressed further for example by pressing upon a snuffer of the lighter, not shown, the disc 27 completely closes the outlet opening 14 of the wick tube 9. The flange 19 then leaves the flange 18 while the packing 23 slides on the surface 12. The elasticity of the disc 27 will cause these parts to rise again when the snuffer is lifted.

According to FIGURE 2 a pot-like housing 30 is set in the cover, not shown, of a gas fueled lighter reservoir, the bottom 31 of which is provided with an opening 32 which can, for instance, be sawed in and connects the interior of the housing with the reservoir. In this housing fits with clearance a substantially cylindrical body 33 which at its lower end has a shoulder 34 and in its upper end surface 35 a recess 36 to receive the flat regulating disc 37 of rubber or the like which is thus supported from the bottom of and within the housing. The body 33 is surrounded by a helical spring 38 which abuts the shoulder 34 and the end surface 40 of a regulating member 39 disposed above the disc 37, thus acting between the bottom of the housing and the member 39 to urge the latter upwardly. The regulating member which is open-topped is slidable piston fashion and is sealed to the inner wall 42 of the housing in this example by a flexible ring packing 41 and it can be axially displaced therein. Displacement is effected by means of a regulating cap 45 which screws into a thread 44 in the upper part 43 of the housing, by the aid of a knurled rim 46 of larger diameter which through its lower end, not shown, bears against the upper end, also not shown, of the adjusting member 39.

There is a regulating projection 49 projecting downwardly and a closure projection 50 projecting upwardly from the bottom of the regulating member 39 and a bore 48 extends through the projections, and the bottom of the member 39. The regulating projection 49 in accordance with the invention has a conical external boundary surface 51 which is interpenetrated by a pyramidal widening of the bore 48 to form the irregularities according to the invention, this example having a four sided pyramidal form 52. The resulting angular formations by greater or less penetration into the flat surface 53 of the disc 37 effect the regulation. The end surface 54 of the closure projections 50 is also flat as is the end surface 55 of a closure disc 56 e.g. of rubber or the like which is mounted in a closure body 57 carried with clearance and longitudinal play in the open top of the regulating member 39. The latter is prolonged upwardly by a burner tube 58 of smaller diameter than the body 57, the bore 59 of which communicates through a cross bore 60 in the closure member with the clearance 61 between the closure body and the regulating cap 45. On the shoulder 66 at the junction of the closure body and burner tube is seated a packing 63. To the upper end of the burner tube 58 is secured a burner cap 64 the underside of which constitutes an abutment spaced from the shoulder 66 for a further helical opening spring 65 which surrounds the burner tube 58 and the lower end of which abuts a shoulder 66 on the upper side of the regulating cap 45.

This example operates as follows: By rotating the regulating cap 45 by the aid of its rim 46 the adjusting member 39 can be displaced in relation to the regulating disc 37. With the burner open the opening spring 65 presses the burner tube 58 and the closure body 57 upwardly into a position in which the closure disc 56 is lifted away from the end of the closure projection 50 and leaves the passage 48 open. In this position the packing ring 63 bears against a shoulder in the regulating cap which joins the bore in which the body 57 is movable to the smaller bore through which the burner tube 58 passes, and prevents undesirable flow of gas through the space in which the opening spring 65 is accommodated.

As soon as a snuffer, not shown, presses the burner into the closed position under the action of its spring which is stronger than that of the spring 65 but both of which together are weaker than the pressure of the regulating spring 38, the closure member closes the gas passage by pressing the disc 56 against the closure projection 50.

I claim:

1. In a gas fueled lighter having a reservoir adapted to contain fuel gas under pressure, in combination, an element defining a burner passage carried by said lighter; passage means forming a gas flow passage providing communication between said reservoir and said burner passage, said passage means including an elongated member formed with a bore therethrough forming part of said gas flow passage and having a mouth opening defined by edge portions extending to different heights in axial direction; a sealing member of compressible, homogeneous material arranged opposite and engaging said mouth opening, said edge portions defining between themselves and said sealing member a plurality of small passages also forming part of said gas flow passage; and means operatively connected to one of said members for moving the same relative to the other member in a direction to cause said edge portions to penetrate to a variable degree into said compressible, homogeneous material of the sealing member to change thereby the cross section of said small passages and to regulate thereby flow of gas from said reservoir to said burner passage.

2. A lighter as set forth in claim 1 in which the end portion of said elongated member engaging said sealing member has an outer surface of revolution tapering toward the free end of said elongated member and in which the inner surface of said mouth opening is a pyramidical surface tapering in direction opposite to said outer surface and intersecting the latter.

3. A regulating device according to claim 1 in which said sealing body member is a flat disc.

4. A regulating device according to claim 1 said edge portions extending to different heights in axial directions having angular forms.

5. A regulating device according to claim 1 in which the edge portions of the opening are formed by two concentric mutually oppositely inclined differently shaped boundary surfaces of said elongated members about said mouth opening.

6. A burner for a gas fueled lighted comprising a wick tube set in the top of the reservoir of the lighter, the mouth of which constitutes a closure body of a regulating device and is defined by edge portions extending to different heights in axial direction, a burner cap surrounding the wick tube and sealed to the wick tube at its lower end, a screw member having screw engagement with a part of the lighter and surrounding and engaging the burner cap, an inverted cup member engaged by the burner cap and being apertured for the passage of gas to the burner cap, and a regulating and closure disc of homogeneous, yieldable material carried by said cup member and co-operating with the mouth of the wick tiube in such a manner that during turning of said screw member said edge portions will penetrate to a variable extent into said closure disc to regulate thereby the outflow of gas from said container.

7. A burner for a gas fueled lighter with a regulating device comprising a pot-like burner housing set in the cover of the lighter reservoir, the bottom of which housing has an opening for the passage of gas, a flat regulating disc of homogeneous compressible material supported from the bottom of an within the burner housing, an open topped regulating member above the regulating disc slidably piston fashion in and sealed to the inner wall of the burner housing, a regulating projection projecting downwardly and a closure projecting upwardly from the bottom of the regulating member, with a bore extending through the projection and bottom of the regulating member, the regulating projection and bore presenting irregularities extending at different heights in axal direction and with the regulating disc constituting a regulating revice for regulating outflow of gas from the reservoir and the closure projection having a flat end, a helical spring acting between the bottom of the housing and the regulating member to urge the latter upwardly, a closure body carried with clearance and longitudinal play in the open top of the regulating member, a burner tube of smaller diameter than the closure body upwardly prolonging the closure body and having a longitudinal bore communicating by a cross bore with the clearance around the closure body, a shoulder at the junction of the closure body and the burner tube, a packing ring seated on the shoulder, an abutment on the burner tube spaced from the shoulder, a closure disc of compressible material mounted on the lower end of the closure body to coact with the flat end of the closure projection, a regulating cap screwing into the upper part of the housing and pressing the regulating member against the action of said spring to regulate the position of the regulating projection in relation to the regulating disc, a shoulder in the regulating member joining a bore in which the closure body is movable to a smaller bore through which the burner tube passes, a further helical spring surrounding the burner tube and abutting between the upper side of the regulating cap and said abutment on the burner tube thereby urging the burner tube and closure body into a position in which said closure disc is lifted away from the end of the closure projection and in which said packing ring abuts said last mentioned shoulder.

8. A burner according to claim 7 further comprising between the regulating disc and the bottom of the housing, a substantially cylindrical body which is surrounded by said first mentioned spring, a shoulder at the lower end of the body abutted by said spring, said body having a recess in its upper end surface to receive the regulating disc.

9. In a gas fueled lighter having a reservoir adapted to contain fuel gas under pressure, in combination, a burner housing carried by said lighter and communicating with the interior of said reservoir; a first sealing body of compressible, homogeneous material fixedly supported within said burner housing; elongated hollow regulating means in sealing engagement with the inner surface of said housing and connected thereto adjustable in axial direction, said regulating means having a bottom wall facing said first sealing body and having an upwardly projecting closure projection having a substantially flat end face and a downwardly projecting regulating projection, said projections being formed with a common central bore therethrough, the mouth opening of said central bore in said regulating projection being defined by edge portions extending to different heights in axial direction and engaging said first sealing body so as to define small passages therewith which are adjustable by adjusting the position of said regulating means in axial direction causing thereby said edge portions to penetrate to a variable extent into said first sealing body; burner tube means mounted in part in the interior of said regulating means and having a tubular projection projecting beyond said regulating means and defining a passage communicating with the interior of said regulating means; a second sealing body of compressible material carried by said burner tube means opposite said sealing projection, said burner tube means being movable relative to said regulating means between a sealing position in which said second sealing body carried by said burner tube means engages said sealing projection for closing said bore and an operative position in which said second sealing body is spaced from said bore; and resilient means operatively connected to said burner tube means and tending to resiliently maintain the latter in said operative position.

References Cited by the Examiner

UNITED STATES PATENTS

| 3,048,991 | 8/62 | Iketani | 62—7.1 |
| 3,078,010 | 2/63 | Ichikawa | 67—7.1 |
| 3,083,554 | 4/63 | Iketani | 67—7.1 |
| 3,095,175 | 6/63 | Iketani | 67—7.1 |

FOREIGN PATENTS

| 210,188 | 7/60 | Austria. |
| 1,200,837 | 7/59 | France. |
| 800,939 | 9/58 | Great Britain. |
| 912,597 | 12/62 | Great Britain. |
| 927,984 | 6/63 | Great Britain. |

OTHER REFERENCES

German printed application No. 1,156,591, printed Oct. 31, 1963.

ROBERT A. O'LEARY, *Primary Examiner.*

EDWARD J. MICHAEL, LLOYD L. KING,

*Examiners.*